United States Patent
Baker et al.

(10) Patent No.: US 9,435,357 B2
(45) Date of Patent: Sep. 6, 2016

(54) SELF-SNUBBING HYDRAULIC ACTUATION SYSTEM

(71) Applicant: HONEYWELL INTERNATIONAL INC., Morristown, NJ (US)

(72) Inventors: Mark H. Baker, Scottsdale, AZ (US); Steve Abel, Chandler, AZ (US); Kevin K. Chakkera, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 346 days.

(21) Appl. No.: 14/166,394

(22) Filed: Jan. 28, 2014

(65) Prior Publication Data

US 2016/0010662 A1    Jan. 14, 2016

(51) Int. Cl.
| | |
|---|---|
| F15B 9/03 | (2006.01) |
| B64D 29/06 | (2006.01) |
| F02K 1/76 | (2006.01) |
| F15B 11/048 | (2006.01) |
| F15B 21/08 | (2006.01) |

(52) U.S. Cl.
CPC .............. F15B 9/03 (2013.01); B64D 29/06 (2013.01); F02K 1/763 (2013.01); F15B 11/048 (2013.01); F15B 21/087 (2013.01); *F15B 2211/7058* (2013.01); *F15B 2211/75* (2013.01)

(58) Field of Classification Search
CPC ......... F15B 9/09; F15B 11/048; F02K 1/763
USPC .................... 60/459; 91/392, 397, 403, 404; 244/110 B
See application file for complete search history.

(56) References Cited

U.S. PATENT DOCUMENTS

| | | | | |
|---|---|---|---|---|
| 3,710,687 | A * | 1/1973 | Rench ................ | F15B 15/2853 91/363 R |
| 3,908,935 | A * | 9/1975 | Heintz .................... | B64C 13/50 244/227 |
| 4,077,738 | A * | 3/1978 | Keely ...................... | G05D 3/18 415/36 |
| 4,218,956 | A * | 8/1980 | Uno ..................... | B25J 19/0091 700/69 |
| 4,513,782 | A * | 4/1985 | Contartese ................ | F15B 9/09 137/625.62 |
| 5,285,715 | A * | 2/1994 | Elrod, Jr. ............. | G05B 19/351 137/625.64 |
| 5,486,997 | A | 1/1996 | Reismiller et al. | |
| 5,551,478 | A | 9/1996 | Veilleux, Jr. et al. | |

(Continued)

OTHER PUBLICATIONS

Aviation Electrician's Mate 3 & 2; Nonresident Training Course; NAVEDTRA 14009; Distribution Statement A: Approved for public release; distribution is unlimited. Jan. 1991.

*Primary Examiner* — Thomas E Lazo
(74) *Attorney, Agent, or Firm* — Lorenz & Kopf, LLP

(57) ABSTRACT

A self-snubbing hydraulic actuation system includes a hydraulic motor, a component actuator, a control valve, a valve actuator, and a variable resistance device. The hydraulic motor is configured, upon receipt of hydraulic fluid, to rotate and supply a drive torque. The component actuator is configured, upon receipt of drive torque from the motor, to translate to a position. The control valve is movable to a plurality of valve positions to thereby control hydraulic fluid flow rate to the hydraulic motor. The valve actuator is coupled to the control valve and is adapted to receive electrical current and to move the control valve to a valve position based on the magnitude of the received electrical current. The variable resistance device is configured, based on component actuator position, to selectively vary the magnitude of the electrical current received by the valve actuator.

19 Claims, 6 Drawing Sheets

(56) References Cited

U.S. PATENT DOCUMENTS

| | | | |
|---|---|---|---|
| 6,771,032 B2 * | 8/2004 | Cox-Smith | G05B 19/406 244/110 B |
| 7,401,541 B2 * | 7/2008 | McCarroll | F15B 9/09 91/392 |
| 8,733,080 B2 * | 5/2014 | Jones | F02K 1/09 239/265.31 |
| 8,978,356 B2 * | 3/2015 | Burgess | F02K 1/06 60/226.2 |
| 2012/0233990 A1 * | 9/2012 | Brahmer | F15B 9/09 60/327 |

* cited by examiner $i_{TM}$ : TORQUE MOTOR CURRENT
$X_{ACT}$ : ACTUATOR POSITION
$X_{SPOOL}$ : SPOOL POSITION
$mdot_{FLUID}$ : FLOW RATE OF FLUID
$thetadot_{MTR}$ : ROTATIONAL VELOCITY OF HYDRAULIC MOTOR
$Xdot_{ACT}$ : SLEW RATE OF ACTUATOR
$R_{POT}$ : RESISTANCE OF POTENTIOMETER/VARIABLE RESISTOR

SELF-SNUBBING HYDRAULIC ACTUATION SYSTEM

TECHNICAL FIELD

The present invention generally relates to hydraulic actuation systems, and more particularly relates to a self-snubbing hydraulic actuation system.

BACKGROUND

Actuation systems are used in myriad systems and environments to move one or more components to a plurality of positions. Many of these actuation systems include a mechanism to selectively reduce the velocity of the one or more actuated components. In particular, to reduce the velocity of the one or more actuated components prior to the actuated components reaching one or more positions. For example, many thrust reverser actuation systems include a mechanism to reduce the velocity of the thrust reverser movable components (e.g., transcowls or doors) prior to the movable components reaching the fully deployed and fully stowed positions. This is done, in part, to prevent structural damage.

The mechanisms that are currently employed to selectively reduce actuated component velocity are varied. These mechanisms include using a position feedback device, such as a resolver, an LVDT (linear variable differential transformer), or an RVDT (rotary variable differential transformer), to supply position signals representative of movable component position to a controller. The controller, in turn, reduces the current to a drive torque source, such as a motor.

Although currently deployed mechanisms for reducing actuated component velocity are generally safe and reliable, these mechanisms can exhibit certain drawbacks. For example, those mechanisms that rely on position feedback device and a controller can undesirably increase overall system cost and complexity. Many currently deployed systems may also be temperature sensitive.

Hence, there is a need for an actuation system that selectively reduces the velocity of one or more actuated components and that is less costly and complex than presently known mechanisms, and that exhibits greater tolerance to temperature than presently known systems. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a self-snubbing hydraulic actuation system includes a hydraulic motor, a component actuator, a control valve, a valve actuator, and a variable resistance device. The hydraulic motor is adapted to selectively receive hydraulic fluid and is configured, upon receipt of the hydraulic fluid, to rotate and supply a drive torque. The component actuator is coupled to receive the drive torque supplied by the hydraulic motor and is configured, upon receipt thereof, to translate to a position. The control valve is in fluid communication with the hydraulic motor and is movable to a plurality of valve positions to thereby control hydraulic fluid flow rate to the hydraulic motor. The valve actuator is coupled to the control valve and is adapted to receive electrical current at a magnitude. The valve actuator is configured, upon receipt of the electrical current, to move the control valve to a valve position based on the magnitude of the received electrical current. The variable resistance device is mechanically coupled to the component actuator and is electrically coupled to the valve actuator. The variable resistance device is configured, based on the position of the component actuator, to selectively vary the magnitude of the electrical current received by the valve actuator.

In another embodiment, a self-snubbing hydraulic actuation system includes a hydraulic motor, a component actuator, a control valve, a valve actuator, and a variable resistance device. The hydraulic motor is adapted to selectively receive hydraulic fluid and is configured, upon receipt of the hydraulic fluid, to rotate in one of a first rotational direction or a second rotational direction. The component actuator is coupled to the hydraulic motor. The component actuator is responsive to hydraulic motor rotation in the first direction to translate in a retract direction toward a fully retracted position, and is responsive to hydraulic motor rotation in the second direction to translate in a deploy direction toward a fully deployed position. The control valve is in fluid communication with the hydraulic motor and is movable to a plurality of valve positions to thereby control hydraulic fluid flow rate to the hydraulic motor. The valve actuator is coupled to the control valve and is adapted to receive electrical current at a magnitude. The valve actuator is configured, upon receipt of the electrical current, to move the control valve to a valve position based on the magnitude of the received electrical current. The variable resistance device is mechanically coupled to the component actuator and is electrically coupled to the valve actuator. The variable resistance device is configured to vary the magnitude of the electrical current received by the valve actuator only when the component actuator is translating toward the fully retracted position and is between a first position and the fully retracted position, and translating toward the fully deployed position and is between a second position and the fully deployed position.

In yet another embodiment, a thrust reverser actuation system includes a plurality of thrust reverser movable components, a hydraulic motor, a component actuator, a control valve, a valve actuator, and a variable resistance device. The hydraulic motor is adapted to selectively receive hydraulic fluid and is configured, upon receipt of the hydraulic fluid, to rotate and supply a drive torque. The component actuator is coupled to the hydraulic motor and to the plurality of thrust reverser movable components. The component actuator is responsive to the drive torque supplied by the hydraulic motor to translate the thrust reverser movable components to a position. The control valve is in fluid communication with the hydraulic motor and is movable to a plurality of valve positions to thereby control hydraulic fluid flow rate to the hydraulic motor. The valve actuator is coupled to the control valve and is adapted to receive electrical current at a magnitude. The valve actuator is configured, upon receipt of the electrical current, to move the control valve to a valve position based on the magnitude of the received electrical current. The variable resistance device is mechanically coupled to the component actuator and is electrically coupled to the valve actuator. The variable resistance device is configured, based on the position of the component actuator, to selectively vary the magnitude of the electrical current received by the valve actuator. The component actuator is configured to translate between a fully retracted position and a fully deployed position, and the variable resistance device is configured to vary the magnitude of the electrical current only when the component actuator is (i) translating toward the fully retracted position and is between a first position and the fully retracted position, and (ii) translating toward the fully deployed position and is between a second position and the fully deployed position.

Furthermore, other desirable features and characteristics of the self-snubbing hydraulic actuation system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
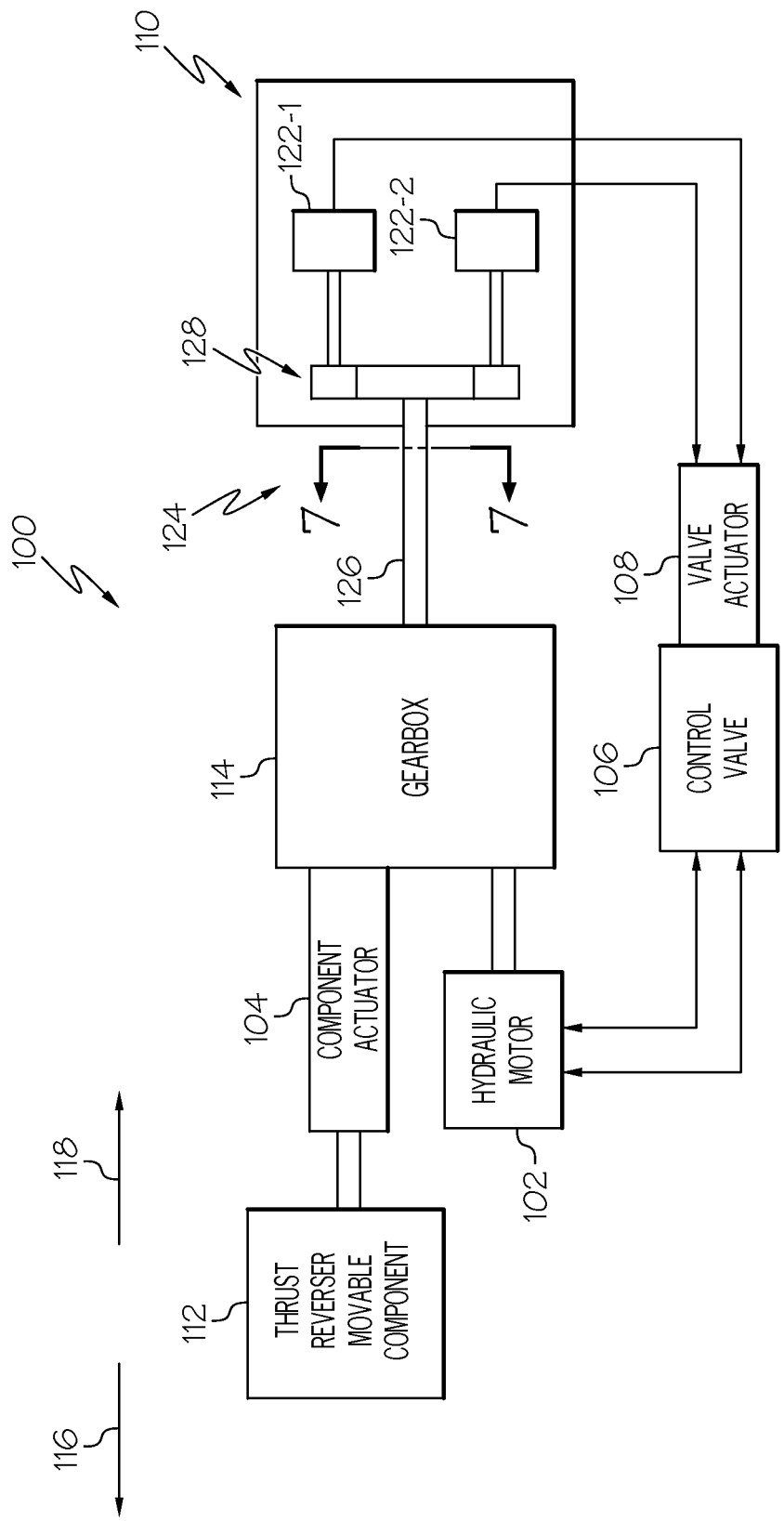
FIG. 1 depicts a functional block diagram of a self-snubbing hydraulic actuation system.

Referring to FIG. 1, a functional block diagram of a self-snubbing hydraulic actuation system 100 is depicted, and includes a hydraulic motor 102, a component actuator 104, a control valve 106, a valve actuator 108, and a variable resistance device 110. Before describing the system 100 further, it is noted that the depicted system 100 is used to move one or more thrust reverser movable components 112 (only one depicted), such as one or more transcowls or doors. It will be appreciated, however, that it may be used to move any one of numerous other devices or components.

The hydraulic motor 102 adapted to selectively receive hydraulic fluid from a non-illustrated hydraulic fluid source. The hydraulic motor 102, which may be implemented using any one of numerous hydraulic motors, is configured, upon receipt of the hydraulic fluid, to rotate and supply a drive torque. The drive torque is supplied to at least the component actuator 104 via, for example, a gearbox 114.

The component actuator 104 is coupled to receive the drive torque supplied by the hydraulic motor 102 and is configured, upon receipt of the drive torque, to translate to a position. It will be appreciated that the component actuator 104 may be implemented using any one of numerous types of actuators. In the depicted embodiment, the component actuator 104 is implemented using a ball screw actuator. Regardless of how it is specifically implemented, the component actuator 104 is coupled to the thrust reverser movable component 112, and is used to move the thrust reverser movable component 112 in a deploy direction 116 or a retract direction 118 to thereby move it to a fully deployed position or a fully retracted (or stowed) position, respectively.

As may be appreciated, the direction in which, and the rate at which, the component actuator 104 moves the thrust reverser movable component 112 depends upon the direction in which, and rate at which, the hydraulic motor 102 rotates. Moreover, the direction in which, and the rate at which, the hydraulic motor 102 rotates depends on the direction and flow rate of hydraulic fluid through the hydraulic motor 102. The direction and flow rate of hydraulic fluid through the hydraulic motor 102 is controlled via the control valve 106.

The control valve 106 is in fluid communication with the hydraulic motor 102 and the non-illustrated hydraulic fluid source. The control valve 106, which may be implemented using a single valve element or plural valve elements, is movable to a plurality of valve positions. The position of the control valve 106 is used to control both the direction and the flow rate of hydraulic fluid to and through the hydraulic motor 102. The control valve 106 may be implemented using any one of numerous known devices including, for example, one or more spool valves, or one or more directional control valves, just to name a few non-limiting examples.

The control valve 106 is positioned using the valve actuator 108. The valve actuator 108 is coupled to the control valve 106 and is adapted to receive electrical current from a non-illustrated electrical current source. The valve actuator 108 is configured, upon receipt of the electrical current, to move the control valve 106 to a valve position based, at least in part, on the magnitude of the received electrical current. It will be appreciated that the valve actuator 108 may be implemented using a single device or a plurality of devices, and may be implemented using any one of numerous types of actuation devices. For example, the valve actuator 108 may be implemented using a torque motor, or the control valve 106 and valve actuator 108 may be combined into a single device, just to name a few non-limiting examples.

The magnitude of the current supplied to the valve actuator 108 is controlled via the variable resistance device 110, which, as FIG. 1 depicts, is coupled to both the component actuator 104 and the valve actuator 108. In particular, the variable resistance device is mechanically coupled to the component actuator 104, and is electrically coupled to the valve actuator 108. The variable resistance device 110 may be mechanically coupled to the component actuator 104 using any one of numerous techniques, but in the depicted embodiment it is coupled thereto via the gearbox 114. Thus, as may be appreciated, the variable resistance device is also mechanically coupled, via the gearbox 114, to the hydraulic motor 102. Regardless, it will be appreciated that the gearbox 114 is configured such that the mechanical input received by the variable resistance device 110 corresponds to the position of the component actuator 104.

Figure 2A:
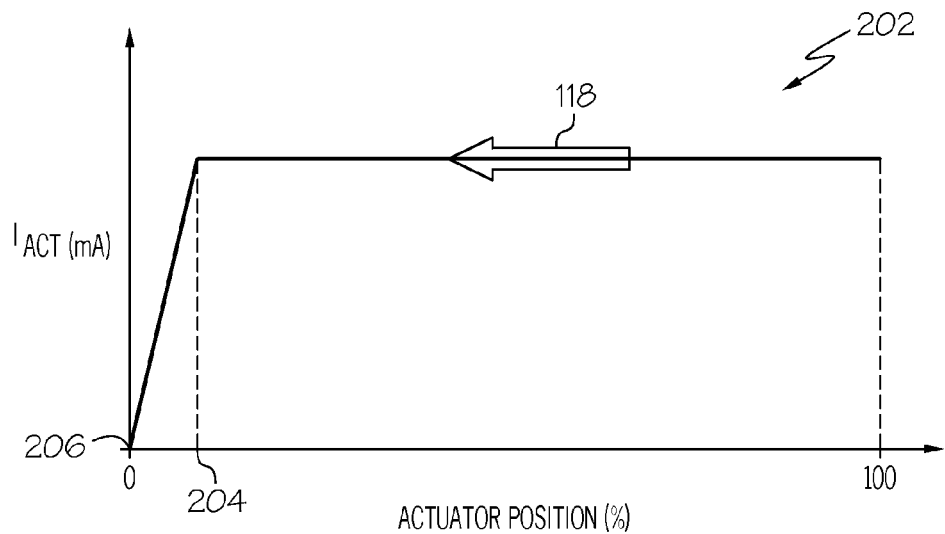
FIGS. 2A and 2B graphically depict the speed snubbing function implemented by the system of FIG. 1.
Figure 2B:
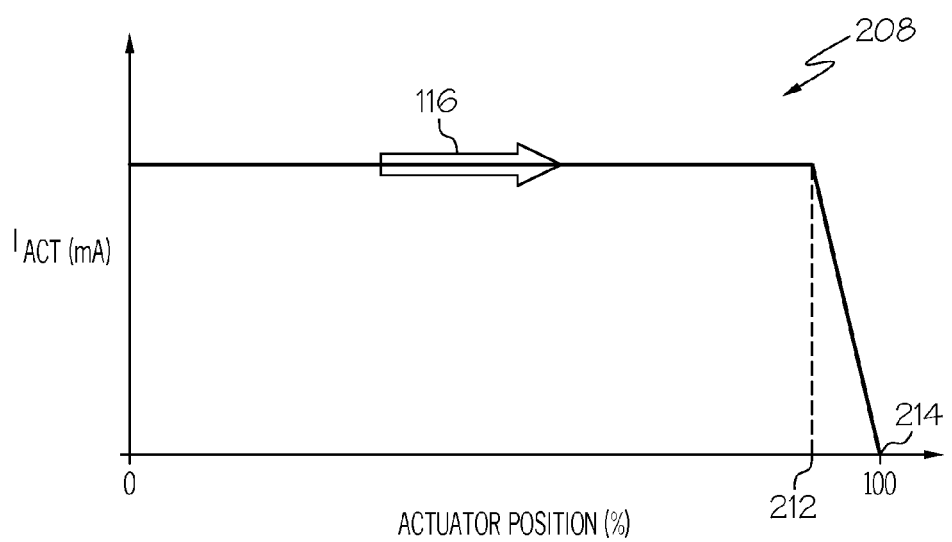

The variable resistance device 110 is configured, based on the position of the component actuator 104, to selectively vary the magnitude of the electrical current received by the valve actuator 108, and thereby implements a speed-snubbing function. In particular, the variable resistance device 110 is preferably configured to vary the magnitude of the electrical current only during two instances, which are graphically depicted in FIGS. 2A and 2B. The first instance 202 is when the component actuator 104 is translating toward the fully retracted position (e.g., in the stow direction 118) and is between a first position 204 and the fully retracted position 206. The second instance 208 is when the component actuator 104 is translating toward the fully deployed position (e.g., in the deploy direction 116) and is between a second position 212 and the fully deployed position 214. As may be appreciated, varying the current magnitude in this manner reduces the velocity of the thrust reverser movable components 112 prior to the movable components 112 reaching the fully stowed and fully deployed positions.

As with the various other components associated with the system 100, the variable resistance device 110 may be implemented using any one of numerous types of variable resistance circuit elements 122 and various mechanical elements 124. In the embodiment depicted in FIG. 1, the variable resistance device 110 is implemented using two variable resistance circuit elements 122 (e.g., 122-1, 122-2). However, as will be described further below, in some embodiments the variable resistance device 110 may be implemented using only one variable resistance circuit element 122.

The mechanical elements 124 include a drive shaft 126 and a gear set 128. The drive shaft 126 is mechanically coupled, via the gearbox 114, to the component actuator 104, and is additionally coupled to the gear set 128. As will be described further below, the drive shaft 126 is configured to either selectively, or continuously, drive the gear set 128, to thereby vary the electrical resistance of the one or more variable resistance circuit elements 122.

Regardless of the number of variable resistance circuit elements 122 that are used, each may be implemented using any one of numerous known variable resistance circuit elements. For example, in various particular embodiments, the variable resistance circuit elements 122 are implemented using one or more linear or rotary potentiometer circuits. Various configurations of the variable resistance circuit elements 122 are depicted in FIGS. 3-6, and with reference thereto will now be described, beginning first with FIG. 3.

Figure 3:
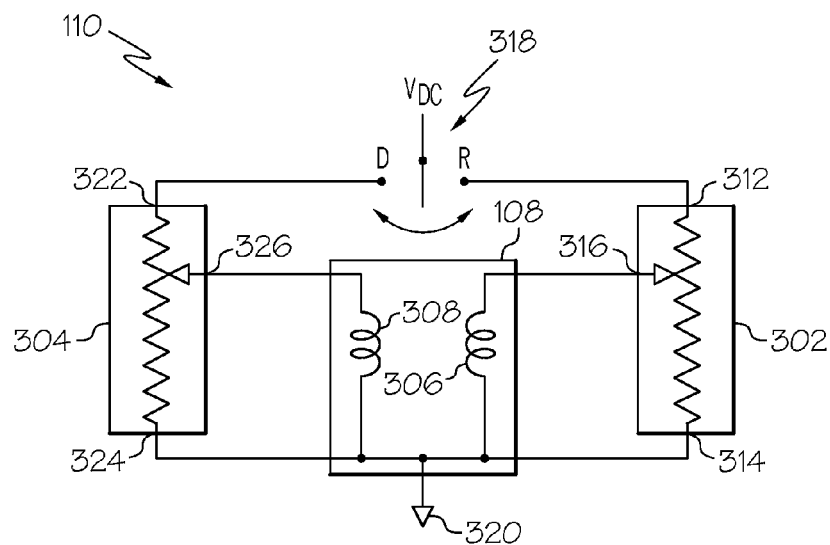
FIGS. 3-6 depict various configurations of variable resistance circuit elements that may be used to implement the system of FIG. 1.

In the embodiment depicted in FIG. 3, the variable resistance device 110 includes two potentiometer circuits—a retract potentiometer circuit 302 and a deploy potentiometer circuit 304. In addition, it is seen that the depicted valve actuator 108 is implemented using two actuation circuit elements, such as two separate torque motor coils—a first actuator coil 306 and a second actuator coil 308. Indeed, before proceeding further it is noted that in each of the depicted and described embodiments, the valve actuator 108 is implemented using two actuation circuit elements. For consistency and ease of explanation, each is depicted as being implemented with the first actuator coil 306 and the second actuator coil 308. The difference is that in the embodiment depicted in FIG. 3, the first and second actuator coils 306, 308 are separately energized, whereas in the remainder of the embodiments, the first and second actuator coils 306, 308 are simultaneously energized. It should additionally be noted that the configuration of the coils 306, 308 (e.g., whether energized separately or simultaneously) may depend on the redundancy requirements for the installed system.

Continuing with the embodiment depicted in FIG. 3, the retract potentiometer circuit 302 includes at least three terminals—a first retract resistor terminal 312, a second retract resistor terminal 314, and a retract potentiometer wiper 316. The first retract resistor terminal 312 is connected to be selectively coupled, via a control switch 318, to the non-illustrated electrical current source, and the second retract resistor terminal 314 is coupled to a circuit common node 320. The retract potentiometer wiper 316 is coupled to the valve actuator 108, and more specifically to the first actuator coil 306, to selectively vary the magnitude of the electrical current supplied to the valve actuator 108.

The deploy potentiometer circuit 304 also includes at least three terminals—a first deploy resistor terminal 322, a second deploy resistor terminal 324, and a deploy potentiometer wiper 326. The first deploy resistor terminal 322 is connected to be selectively coupled, via the control switch 318, to the non-illustrated electrical current source, and the second deploy resistor terminal 324 is coupled to the circuit common node 320. The deploy potentiometer wiper 326 is coupled to the valve actuator 108, and more specifically to the second actuator coil 308, to selectively vary the magnitude of the electrical current supplied to the valve actuator 108.

Figure 4:
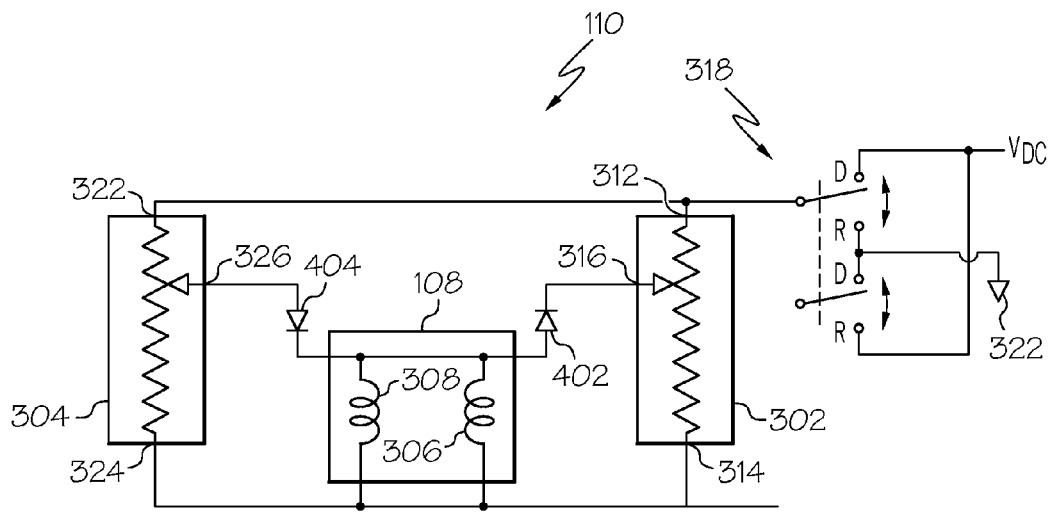

Turning now to the embodiment depicted in FIG. 4, the variable resistance device 110 also includes the retract potentiometer 302, the deploy potentiometer 304, the first actuator coil 306, and the second actuator coil 308. However, the variable resistance device 110 is configured such that the first and second actuator coils 306, 308 are simultaneously energized, and the control switch 318 is configured to reverse the polarity of the voltage across, and thus the direction of current flow through, the first and second actuator coils 306, 308. In addition, to ensure that current flows through the first and second coils 306, 308 in the appropriate direction, the variable resistance device 110 includes two diodes—a retract diode 402 and a deploy diode 404. The retract diode 402 is electrically coupled between the retract potentiometer wiper 316 and the first and second actuator coils 306, 308, and the deploy diode 404 is electrically coupled between the deploy potentiometer wiper 326 and the first and second actuator coils 306, 308.

Figure 5:
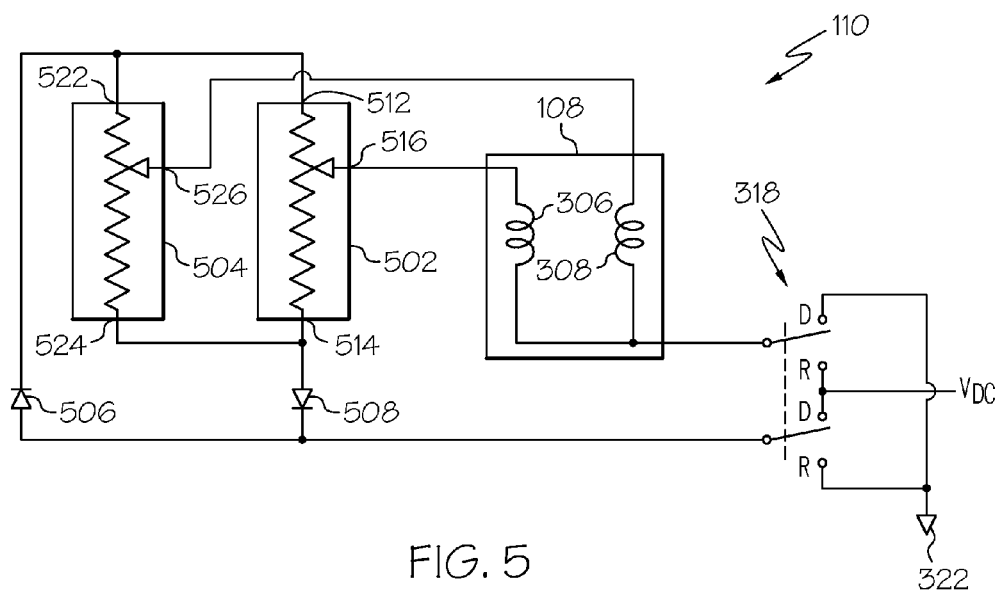

The variable resistance device 110 depicted in FIG. 5 is similar to the embodiment depicted in FIG. 4 in that it includes two potentiometer circuits, two actuator coils, and two diodes. However, with this embodiment current flows through both potentiometer circuits during both a retract operation and deploy operation, and thus simultaneously vary the magnitude of the electrical current to the valve actuator 108 (e.g., both the first and second coils 306, 308) during the above-mentioned two instances. Thus, a different naming convention is used to describe this embodiment. In particular, the depicted embodiment includes a first potentiometer circuit 502, a second potentiometer circuit 504, a first diode 506, and a second diode 508, and additionally includes the first and second actuator coils 306, 308.

The first potentiometer circuit 502 includes at least three terminals—a first potentiometer first resistor terminal 512, a first potentiometer second resistor terminal 514, and a first potentiometer wiper 516. The first potentiometer first resistor terminal 512 is coupled to the first diode 506, which is in turn coupled to the control switch 318. The first potentiometer second resistor terminal 514 is coupled to the second diode 506, which is also in turn coupled to the control switch 318. The first potentiometer wiper 516 is coupled to the valve actuator 108, and more particularly to the first actuator coil 306.

The second potentiometer circuit 504 also includes at least three terminals—a second potentiometer first resistor terminal 522, a second potentiometer second resistor terminal 524, and a second potentiometer wiper 526. The second potentiometer circuit 504 is coupled in parallel with the first potentiometer circuit 502 and the second potentiometer wiper 526 coupled to the valve actuator 108, and more particularly to the second actuator coil 308.

Before describing the embodiment depicted in FIG. 6, it is noted that the first and second potentiometer circuits 502, 504 are preferably identical, and that the first and second potentiometer wipers 516, 526 are preferably configured, for redundancy reasons, to be operated simultaneously via a common mechanism (embodiments of which are described below). Moreover, the embodiment depicted in FIG. 5 can suffer the loss of a single coil 306, 308 or a single potentiometer 502, 504 and remain operational. This is in contradistinction to the embodiment depicted in FIG. 3, which has no redundancy, and the embodiment depicted in FIG. 4, which has only coil redundancy. That is, with the FIG. 3 embodiment a failed coil 306, 308 or potentiometer circuit 302, 304 will render the system 100 non-operational, whereas with the FIG. 4 embodiment can withstand a single coil failure, but not a single potentiometer circuit failure.

Figure 6:
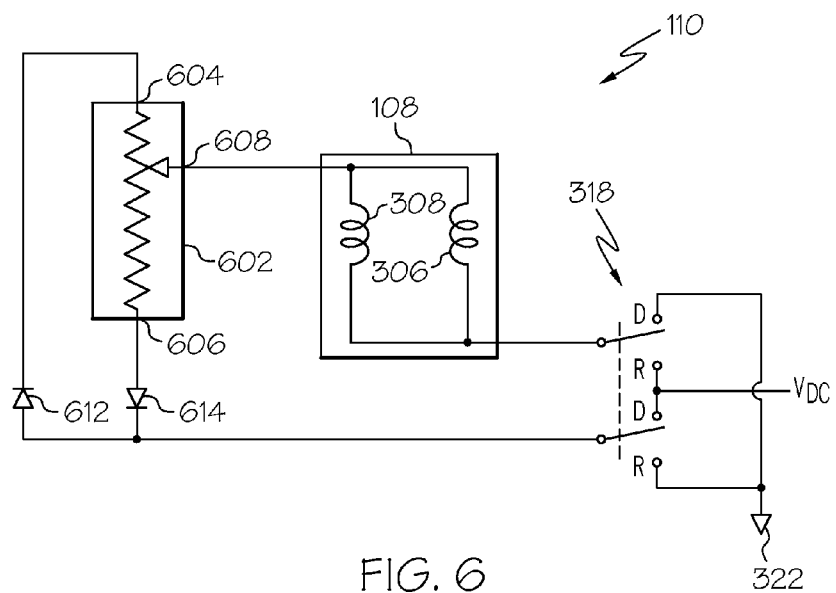

With reference now to FIG. 6, an embodiment in which the variable resistance device 110 is implemented using a single potentiometer circuit 602 is depicted and will now be described. The potentiometer circuit 602 includes a first resistor terminal 604, a second resistor terminal 606, and a wiper 608. The first resistor terminal 604 is coupled to a first diode 612, which is in turn coupled to the control switch 318. The second resistor terminal 606 is coupled to a second diode 614, which is also in turn coupled to the control switch 318. The wiper 608 is coupled to the valve actuator 108, and more specifically to both first and second actuator coils 306, 308. The potentiometer circuit 602 thus varies the magnitude of the electrical current to the valve actuator 108 during the above-mentioned instances.

With reference back to FIG. 1, it was previously noted that the electrical resistance of the one or more variable resistance circuit elements 122 is varied by the drive shaft 126 either selectively or continuously driving the gear set 128. More specifically, in one embodiment the drive shaft 126 is configured to only selectively drive the gear set 128, and in another embodiment the drive shaft 126 is configured to continuously drive the gear set 128. These two embodiments are depicted in FIGS. 7 and 8 and will now be described, beginning with the embodiment depicted in FIG. 7.

Figure 7:
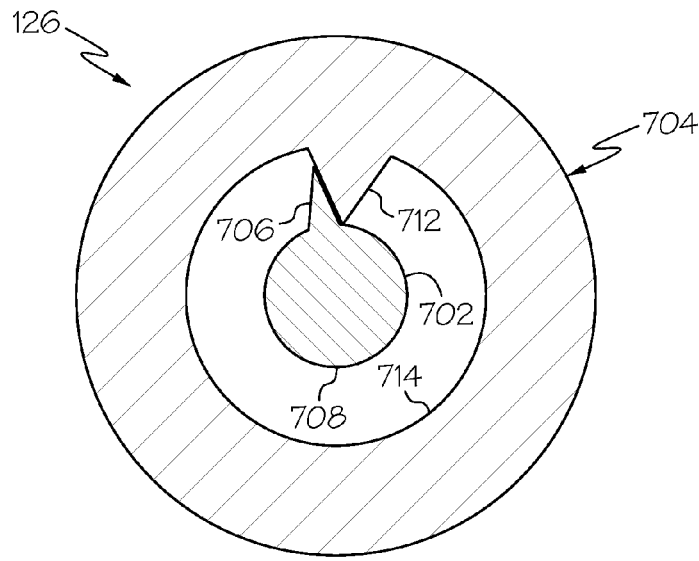
FIGS. 7 and 8 depict different embodiments of a portion of the system of FIG. 1.

In the embodiment depicted in FIG. 7, which is a cross section view taken along line 7-7 in FIG. 1, the drive shaft 126 includes an input shaft 702 and a circuit drive shaft 704. The input shaft 702 is mechanically coupled to the component actuator 104, via the gearbox 114, and is configured to selectively engage the circuit drive shaft 704. The circuit drive shaft 704 is coupled to one or both of the variable resistance circuit elements 122 (e.g., via the gear set 128), and is configured, upon being engaged, to vary the resistance of the one or more variable resistance circuit elements 122 to thereby vary the magnitude of the electrical current to the valve actuator 108.

To implement the above-described functionality, it is seen that, at least in the depicted embodiment, a portion of the input shaft 702 is disposed within the circuit drive shaft 704. Additionally, the input shaft 702 has a first blade 706 that is formed on and extends outwardly from its outer surface 708, and the circuit drive shaft 704 has a second blade 712 that is formed on and extends inwardly from its inner surface 714. Thus, when the input shaft 702 is rotated, the circuit drive shaft 704 is engaged by the input shaft 702 for only a fraction of that rotation. The first and second blades 706, 712 are disposed, and the gearbox 114 is configured, such that the input shaft 702 only engages the circuit drive shaft 704 when the component actuator 104 is translating toward the fully retracted position (e.g., in the stow direction 118) and is between a first position 204 and the fully retracted position 206, and when the component actuator 104 is translating toward the fully deployed position (e.g., in the deploy direction 116) and is between a second position 212 and the fully deployed position 214.

Figure 8:
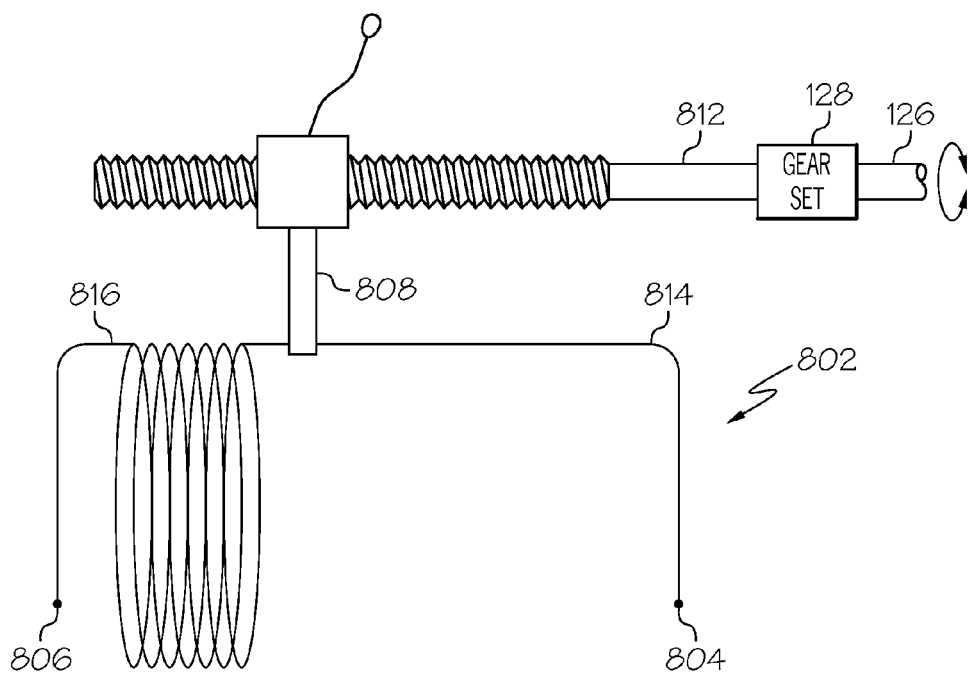

Referring now to FIG. 8, an embodiment in which the drive shaft 126 is configured to continuously drive the gear set 128 is depicted. In this embodiment, rather than the drive shaft 126 being uniquely configured, the variable resistance circuit elements 122 are uniquely configured. In particular, each variable resistance circuit element 122 (only one depicted in FIG. 8) include a resistor circuit 802 having two terminals—a first terminal 804 and a second terminal 806. Each variable resistance circuit element 122 also includes a wiper 808 that is electrically connected to the resistor circuit 802 between the two terminals 804, 806, and is mechanically coupled, via a wiper shaft 812 and the gear set 128, to the drive shaft 126.

The drive shaft 126 is coupled to the component actuator 104, via the gearbox 114, and is additionally coupled, via the gear set 128 and the wiper shafts 812, to the wipers 808. The wiper shafts 812 and wipers 808 are configured such that the wipers 808, in response to the component actuator 104 moving between the retract position and the deploy position, are concomitantly moved between two end positions 814, 816. As FIG. 8 readily depicts, each resistor circuit 802 is configured such that electrical resistance at its potentiometer wiper 808 varies during only a fraction of movement between the two end positions 814, 816.

Figure 9:
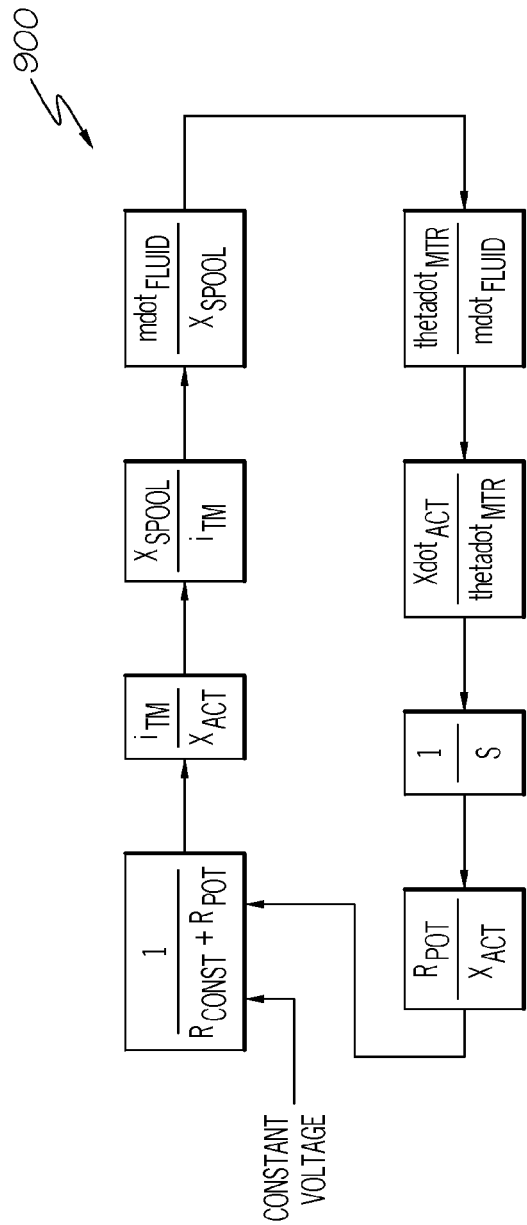
FIG. 9 depicts a functional block diagram of a control that the system of FIG. 1 may be configured to implement.

The system described herein is a self-snubbing hydraulic actuation system 100. That is, the hydraulic actuation system 100 depicted and described herein implements a speed snubbing functionality at the two ends of actuation. For completeness, FIG. 9 depicts a functional block diagram of a control 900 implemented by the system 100. As may be readily understood from the depicted control 900, the system 100 described herein implements the speed snubbing function at a cost and complexity that is less when compared to presently known systems. Moreover, unlike presently known systems, the system described herein requires no external command and does not generate or use an error signal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A self-snubbing hydraulic actuation system, comprising:
    a hydraulic motor adapted to selectively receive hydraulic fluid and configured, upon receipt of the hydraulic fluid, to rotate and supply a drive torque;
    a component actuator coupled to receive the drive torque supplied by the hydraulic motor and configured, upon receipt thereof, to translate to a position;
    a control valve in fluid communication with the hydraulic motor and movable to a plurality of valve positions to thereby control hydraulic fluid flow rate to the hydraulic motor;
    a valve actuator coupled to the control valve and adapted to receive electrical current at a magnitude, the valve actuator configured, upon receipt of the electrical current, to move the control valve to a valve position based on the magnitude of the received electrical current; and
    a variable resistance device mechanically coupled to the component actuator and electrically coupled to the valve actuator, the variable resistance device configured, based on the position of the component actuator, to selectively vary the magnitude of the electrical current received by the valve actuator,
    wherein:
        the component actuator is configured to translate between a fully retracted position and a fully deployed position; and
        the variable resistance device is configured to vary the magnitude of the electrical current only when the component actuator is:
            (i) translating toward the fully retracted position and is between a first position and the fully retracted position, and
            (ii) translating toward the fully deployed position and is between a second position and the fully deployed position.

2. The system of claim 1, wherein the variable resistance device comprises:
    a retract potentiometer circuit including a retract potentiometer wiper coupled to the valve actuator to vary the magnitude of the electrical current to the valve actuator only when the component actuator is between the first position and the fully retracted position; and
    a deploy potentiometer circuit including a deploy potentiometer wiper coupled to the valve actuator to vary the magnitude of the electrical current to the valve actuator only when the component actuator is between the second position and the fully deployed position.

3. The system of claim 2, wherein the valve actuator comprises:
    a first actuator coil electrically coupled to the retract potentiometer wiper; and
    a second actuator coil electrically coupled to the deploy potentiometer circuit wiper.

4. The system of claim 2, wherein the valve actuator comprises:
    a first actuator coil;
    a second actuator coil;
    a retract diode electrically coupled between the retract potentiometer wiper and the first and second actuator coils; and
    a deploy diode electrically coupled between the deploy potentiometer wiper and the first and second actuator coils.

5. The system of claim 2, wherein the variable resistance device further comprises:
    a circuit drive shaft coupled to the retract and deploy potentiometer circuits, the circuit drive shaft adapted to be selectively engaged and configured, upon being engaged, to vary the magnitude of the electrical current to the valve actuator; and
    an input shaft mechanically coupled to the component actuator and configured to engage the circuit drive shaft between (i) the first position and the fully retracted position and (ii) the second position and the fully deployed position.

6. The system of claim 2, wherein:
    the variable resistance device further comprises a drive shaft coupled to the component actuator and to the retract and deploy potentiometer wipers, the drive shaft configured to simultaneously move the retract and deploy potentiometer wipers between two end positions;
    the retract and deploy potentiometer circuits each further include a resistor circuit having two terminals, each potentiometer wiper electrically connected to its associated resistor circuit between the two terminals; and
    each resistor circuit is configured such that electrical resistance at its associated potentiometer wiper varies during only a fraction of movement between the two end positions.

7. The system of claim 1, wherein the variable resistance device comprises a potentiometer circuit including a wiper coupled to the valve actuator to vary the magnitude of the electrical current to the valve actuator only when the component actuator is between (i) the first position and the fully retracted position and (ii) the second position and the fully deployed position.

8. The system of claim 7, wherein the variable resistance device further comprises:
    a circuit drive shaft coupled to the potentiometer circuit, the circuit drive shaft adapted to be selectively engaged and configured, upon being engaged, to vary the magnitude of the electrical current to the valve actuator;
    an input shaft mechanically coupled to the component actuator and configured to engage the circuit drive shaft between (i) the first position and the fully retracted position and (ii) the second position and the fully deployed position.

9. The system of claim 7, wherein:
    the variable resistance device further comprises a drive shaft coupled to the component actuator and to the wiper, the drive shaft configured to move the wiper between two end positions;
    the potentiometer circuit further includes a resistor circuit having two terminals;

the wiper is electrically connected to the resistor circuit between the two terminals; and the resistor circuit is configured such that electrical resistance at the wiper varies during only a fraction of movement between the two end positions.

10. The system of claim 1, wherein the variable resistance device comprises:
a first potentiometer circuit including a first potentiometer wiper coupled to the valve actuator; and
a second potentiometer circuit electrically coupled in parallel with the first potentiometer circuit and including a second potentiometer wiper coupled to the valve actuator,
wherein the first and second potentiometer circuits simultaneously vary the magnitude of the electrical current to the valve actuator only when the component actuator is (i) between the first position and the fully retracted position and (ii) between the second position and the fully deployed position.

11. The system of claim 10, wherein the valve actuator comprises:
a first actuator coil electrically coupled to the first potentiometer wiper; and
a second actuator coil electrically coupled to the second potentiometer wiper.

12. The system of claim 10, wherein the variable resistance device further comprises:
a circuit drive shaft coupled to the first and second potentiometer circuits, the circuit drive shaft adapted to be selectively engaged and configured, upon being engaged, to simultaneously vary the magnitude of the electrical current to the first and second actuator coils;
an input shaft mechanically coupled to the component actuator and configured to engage the circuit drive shaft between (i) the first position and the fully retracted position and (ii) the second position and the fully deployed position.

13. The system of claim 12, wherein the variable resistance device comprises a potentiometer circuit including a wiper coupled to the valve actuator to vary the magnitude of the electrical current to the valve actuator only when the component actuator is between (i) the first position and the fully retracted position and (ii) the second position and the fully deployed position.

14. The system of claim 12, wherein:
the variable resistance device comprises:
a first potentiometer circuit including a first potentiometer wiper coupled to the valve actuator, and
a second potentiometer circuit electrically coupled in parallel with the first potentiometer circuit and including a second potentiometer wiper coupled to the valve actuator,
the valve actuator comprises:
a first actuator coil electrically coupled to the first potentiometer wiper, and
a second actuator coil electrically coupled to the second potentiometer wiper; and
the first and second potentiometer circuits simultaneously vary the magnitude of the electrical current to the valve actuator only when the component actuator is (i) between the first position and the fully retracted position and (ii) between the second position and the fully deployed position.

15. The system of claim 10, wherein:
the variable resistance device further comprises a drive shaft coupled to the component actuator and to the first and second potentiometer wipers, the drive shaft configured to simultaneously move the first and second potentiometer wipers between two end positions;
the first and second potentiometer circuits each further include a resistor circuit having two terminals, each potentiometer wiper electrically connected to its associated resistor circuit between the two terminals; and
each resistor circuit is configured such that electrical resistance at its associated potentiometer wiper varies during only a fraction of movement between the two end positions.

16. A self-snubbing hydraulic actuation system, comprising:
a hydraulic motor adapted to selectively receive hydraulic fluid and configured, upon receipt of the hydraulic fluid, to rotate in one of a first rotational direction or a second rotational direction;
a component actuator coupled to the hydraulic motor, the component actuator responsive to hydraulic motor rotation in the first direction to translate in a retract direction toward a fully retracted position, and responsive to hydraulic motor rotation in the second direction to translate in a deploy direction toward a fully deployed position;
a control valve in fluid communication with the hydraulic motor and movable to a plurality of valve positions to thereby control hydraulic fluid flow rate to the hydraulic motor;
a valve actuator coupled to the control valve and adapted to receive electrical current at a magnitude, the valve actuator configured, upon receipt of the electrical current, to move the control valve to a valve position based on the magnitude of the received electrical current; and
a variable resistance device mechanically coupled to the component actuator and electrically coupled to the valve actuator, the variable resistance device configured to vary the magnitude of the electrical current received by the valve actuator only when the component actuator is:
(i) translating toward the fully retracted position and is between a first position and the fully retracted position, and
(ii) translating toward the fully deployed position and is between a second position and the fully deployed position.

17. The system of claim 16, wherein:
the variable resistance device comprises:
a retract potentiometer circuit including a retract potentiometer wiper coupled to the valve actuator to vary the magnitude of the electrical current to the valve actuator only when the component actuator is between the first position and the fully retracted position, and
a deploy potentiometer circuit including a deploy potentiometer wiper coupled to the valve actuator to vary the magnitude of the electrical current to the valve actuator only when the component actuator is between the second position and the fully deployed position; and
the valve actuator comprises:
a first actuator coil electrically coupled to the retract potentiometer wiper, and
a second actuator coil electrically coupled to the deploy potentiometer circuit wiper.

18. The system of claim 16, wherein:
the variable resistance device comprises:
a retract potentiometer circuit including a retract potentiometer wiper coupled to the valve actuator to vary the magnitude of the electrical current to the valve actuator only when the component actuator is between the first position and the fully retracted position, and
a deploy potentiometer circuit including a deploy potentiometer wiper coupled to the valve actuator to vary the magnitude of the electrical current to the valve actuator only when the component actuator is between the second position and the fully deployed position; and the valve actuator comprises:
a first actuator coil,
a second actuator coil,
a retract diode electrically coupled between the retract potentiometer wiper and the first and second actuator coils, and
a deploy diode electrically coupled between the deploy potentiometer wiper and the first and second actuator coils.

19. A thrust reverser actuation system, comprising:
a plurality of thrust reverser movable components;
a hydraulic motor adapted to selectively receive hydraulic fluid and configured, upon receipt of the hydraulic fluid, to rotate and supply a drive torque;
a component actuator coupled to the hydraulic motor and to the plurality of thrust reverser movable components, the component actuator responsive to the drive torque supplied by the hydraulic motor to translate the thrust reverser movable components to a position;
a control valve in fluid communication with the hydraulic motor and movable to a plurality of valve positions to thereby control hydraulic fluid flow rate to the hydraulic motor;
a valve actuator coupled to the control valve and adapted to receive electrical current at a magnitude, the valve actuator configured, upon receipt of the electrical current, to move the control valve to a valve position based on the magnitude of the received electrical current; and
a variable resistance device mechanically coupled to the component actuator and electrically coupled to the valve actuator, the variable resistance device configured, based on the position of the component actuator, to selectively vary the magnitude of the electrical current received by the valve actuator,
wherein:
the component actuator is configured to translate between a fully retracted position and a fully deployed position, and
the variable resistance device is configured to vary the magnitude of the electrical current only when the component actuator is (i) translating toward the fully retracted position and is between a first position and the fully retracted position, and (ii) translating toward the fully deployed position and is between a second position and the fully deployed position.

* * * * *